(12) United States Patent
Tsai et al.

(10) Patent No.: US 10,042,158 B2
(45) Date of Patent: Aug. 7, 2018

(54) LENS MODULE

(71) Applicant: Cal-Comp Electronics & Communications Company Limited, New Taipei (TW)

(72) Inventors: Tung-Kai Tsai, New Taipei (TW); Teng-Nan Lo, New Taipei (TW); Shyh-Yong Shen, New Taipei (TW)

(73) Assignee: Cal-Comp Electronics & Communications Company Limited, New Taipei (TW)

( * ) Notice: Subject to any disclaimer, the term of this patent is extended or adjusted under 35 U.S.C. 154(b) by 154 days.

(21) Appl. No.: 15/191,544

(22) Filed: Jun. 24, 2016

(65) Prior Publication Data

US 2017/0343793 A1 Nov. 30, 2017

(30) Foreign Application Priority Data

May 25, 2016 (CN) .......................... 2016 1 0352095

(51) Int. Cl.
*G02B 26/04* (2006.01)
*G02B 7/02* (2006.01)
(Continued)

(52) U.S. Cl.
CPC .............. *G02B 26/04* (2013.01); *G02B 7/02* (2013.01); *G02B 7/023* (2013.01); *G03B 9/10* (2013.01); *G03B 9/26* (2013.01); *H04N 5/2254* (2013.01)

(58) Field of Classification Search
CPC ........ G02B 26/04; G02B 26/02; G02B 5/005; G02B 7/022; G02B 7/023; G02B 7/16;
(Continued)

(56) References Cited

U.S. PATENT DOCUMENTS 5,923,913 A * 7/1999 O'Brien .................. G03B 9/06
396/510
2004/0027476 A1 2/2004 Masuda
(Continued)

FOREIGN PATENT DOCUMENTS

JP 07191380 7/1995
JP 2005-208489 * 8/2005

OTHER PUBLICATIONS

"Search Report of European Counterpart Application," dated Oct. 11, 2017, p. 1-p. 7.

*Primary Examiner* — Jordan Schwartz (74) *Attorney, Agent, or Firm* — JCIPRNET (57) ABSTRACT

A lens module including a base, a lens, a front cover, at least a shielding plate and a gasket is provided. The lens is disposed within the base. The front cover is disposed over the base and the lens, and the base and the front cover may rotate relatively. The shielding plate is pivoted on the base and has a first guide portion. The gasket is fixed on the front cover, the shielding plate is located between the gasket and the base. The gasket has a through hole corresponding to the lens and a second guide portion coupled to the first guide portion. When the base and the front cover rotate relatively, the first guide portion is guided by the second guide portion, the shielding plate can limitedly swing to move to the through hole to cover the lens or move away from the through hole to expose the lens.

10 Claims, 11 Drawing Sheets

(51) Int. Cl.
*G03B 9/10* (2006.01)
*G03B 9/26* (2006.01)
*H04N 5/225* (2006.01)

(58) Field of Classification Search
CPC ... G02B 7/24; G02B 7/02; G03B 9/04; G03B 9/06; G03B 9/10; G03B 9/12; G03B 9/14; G03B 9/16; G03B 9/26; H04N 5/2254
USPC .......................................... 359/738–740, 819
See application file for complete search history.

(56) References Cited

U.S. PATENT DOCUMENTS

| | | | |
|---|---|---|---|
| 2008/0205879 A1* | 8/2008 | Park | G03B 15/02 396/463 |
| 2008/0212958 A1* | 9/2008 | Park | G03B 9/04 396/448 |
| 2009/0185300 A1 | 7/2009 | Iida | |
| 2010/0027986 A1* | 2/2010 | Katano | G03B 11/043 396/448 |
| 2010/0046102 A1 | 2/2010 | Ho | |

\* cited by examiner

LENS MODULE

CROSS-REFERENCE TO RELATED APPLICATION

This application claims the priority benefit of China application serial no. 201610352095.2, filed on May 25, 2016. The entirety of the above-mentioned patent application is hereby incorporated by reference herein and made a part of this specification.

BACKGROUND OF THE INVENTION

Field of the Invention

The invention relates to a lens module, and more particularly relates to a lens module having a manual control shielding plate.

Description of Related Art

A lens module is commonly used in mobile phone, notebook computer, tablet computer, camera, or monitor in order to capture image and record video. The lens module may optionally have a shielding plate, so as to cover the lens via the shielding plate when there is no need to capture image and record video. In current technology, a linking mechanism is mostly driven by a motor to subsequently actuate the shielding plate connected to the linking mechanism to cover or expose the lens. Some of the lens modules is recently equipped with network interconnection function, so the user can remotely control the lens module via network, such as moving (or rotating) the shielding plate, or capturing image and recording video. Although this function can improve the convenience for the user in operating, it also causes information security issues. If people with intention invades the lens module via network, it will be easier to remotely control the lens module so as to obtain private images.

SUMMARY OF THE INVENTION

The invention provides a lens module capable of moving a shielding plate by a manual control method, so as to expose or cover the lens.

The invention provides a lens module including a base, a lens, a front cover, and at least a shielding plate and a gasket. The lens is disposed within the base. The front cover is disposed over the base and the lens, and the base and the front cover are able to rotate relative to each other. The shielding plate is pivoted on the base and has a first guide portion. The gasket is fixed on the front cover, and the shielding plate is located between the gasket and the base. The gasket has a through hole corresponding to the lens and a second guide portion coupled to the first guide portion. The shielding plate limitedly swings with respect to and between the gasket and the base, and when the base and the front cover rotate relative to each other, the first guide portion is guided by the second guide portion so the shielding plate can limitedly swing to either move to the through hole so as to cover the lens or move away from the through hole so as to expose the lens.

In one embodiment of the invention, the base has at least a third guide portion. The front cover has at least a fourth guide portion coupled to the third guide portion, and the fourth guide portion is located at the periphery of the lens.

In one embodiment of the invention, the third guide portion is a sliding block, and the fourth guide portion is a sliding slot.

In one embodiment of the invention, the first guide portion is a sliding pin, and the second guide portion is a sliding slot.

In one embodiment of the present invention, the number of the shielding plates is two. Each of the shielding plates has a connecting side edge. When the base and the front cover rotate relative to each other, the two shielding plates limitedly swing with respect to and between the gasket and the base, and after the two connecting side edges are in contact with each other, the two shielding plates cover the lens.

In one embodiment of the invention, the sum of areas of the two shielding plates is greater than the cross sectional area of the through hole.

In one embodiment of the invention, the base has at least a supporting portion configured to support the gasket, so the gasket and the base define a space accommodating the shielding plate.

In one embodiment of the invention, the supporting portion is located outside a moving path of the shielding plate.

In one embodiment of the invention, the gasket further has at least a locking slot, the front cover further has at least a locking protrusion, and the locking protrusion is engaged with the locking slot.

In one embodiment of the invention, the base and the front cover rotate relative to each other about a first axis, the shielding plate limitedly swings about a second axis with respect to and between the gasket and the base, and the first axis and the second axis are parallel to each other and not coaxial.

Based on the above, the base and the front cover of the lens module of the invention may rotate relative to each other by a manual method to simultaneously drive the shielding plate to limitedly swing with respect to and between the gasket and the base, so the shielding plate can limitedly swing to either move to the through hole of the gasket so as to cover the lens or move away from the through hole of the gasket so as to expose the lens. Therefore, even if the lens module is equipped with network interconnection function, as long as the user makes the shielding plate cover the lens, people with intention, after remotely invading the lens module via network, will not be able to move the shielding plate to expose the lens in order to obtain private images.

In order to make the aforementioned and other features and advantages of the invention more comprehensible, embodiments accompanying figures are described in detail belows.

DESCRIPTION OF THE EMBODIMENTS

Figure 1A:
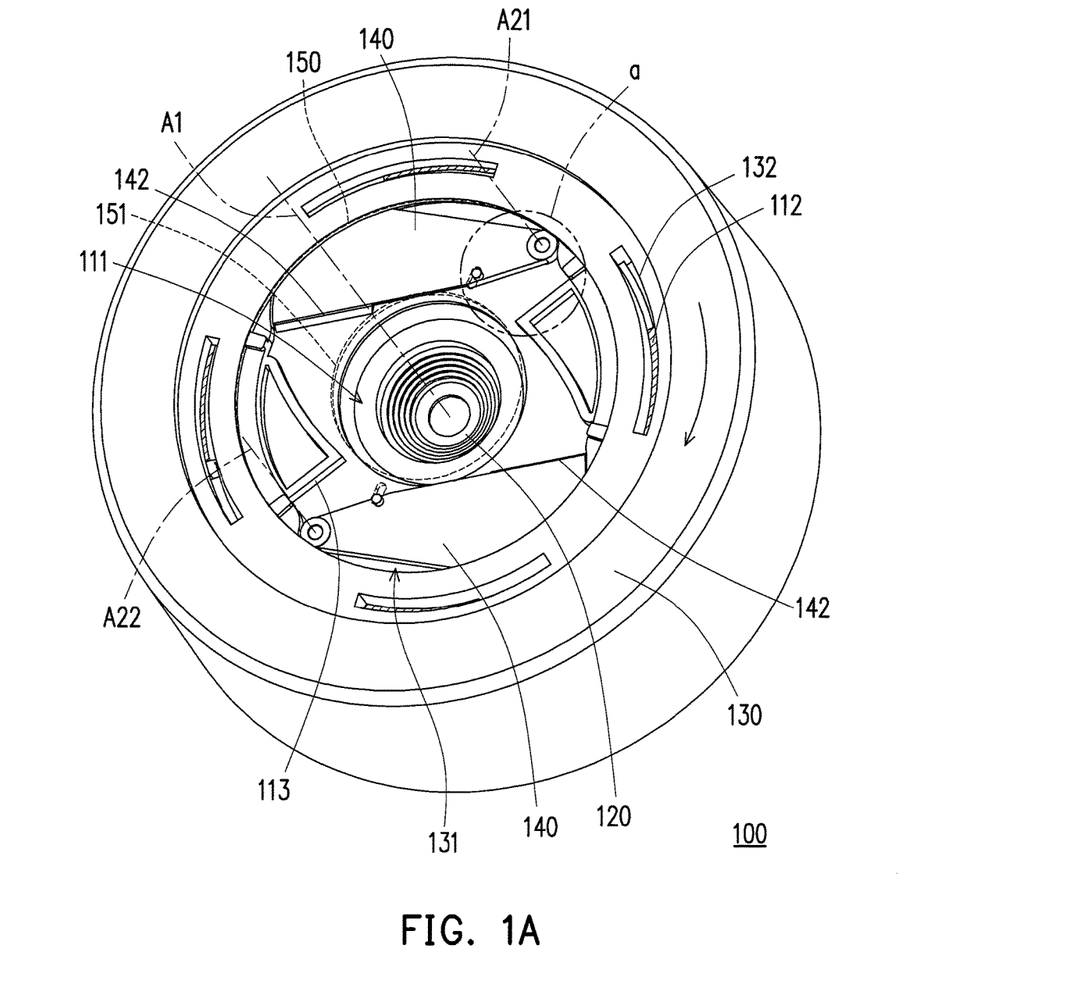
FIG. 1A is a schematic view of a lens module of one embodiment of the invention.
Figure 1B:
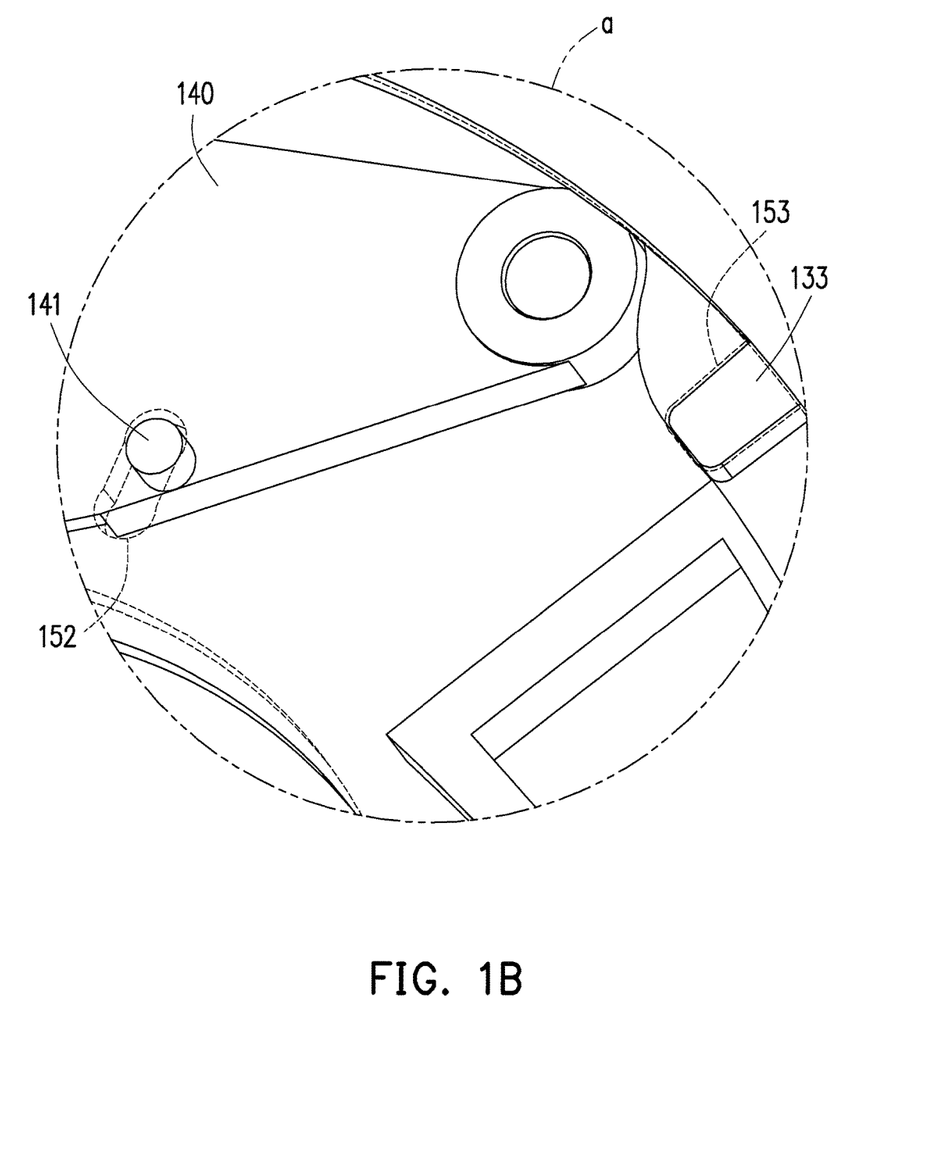
FIG. 1B is a partially enlarged view of an area a in FIG. 1A.
Figure 2:
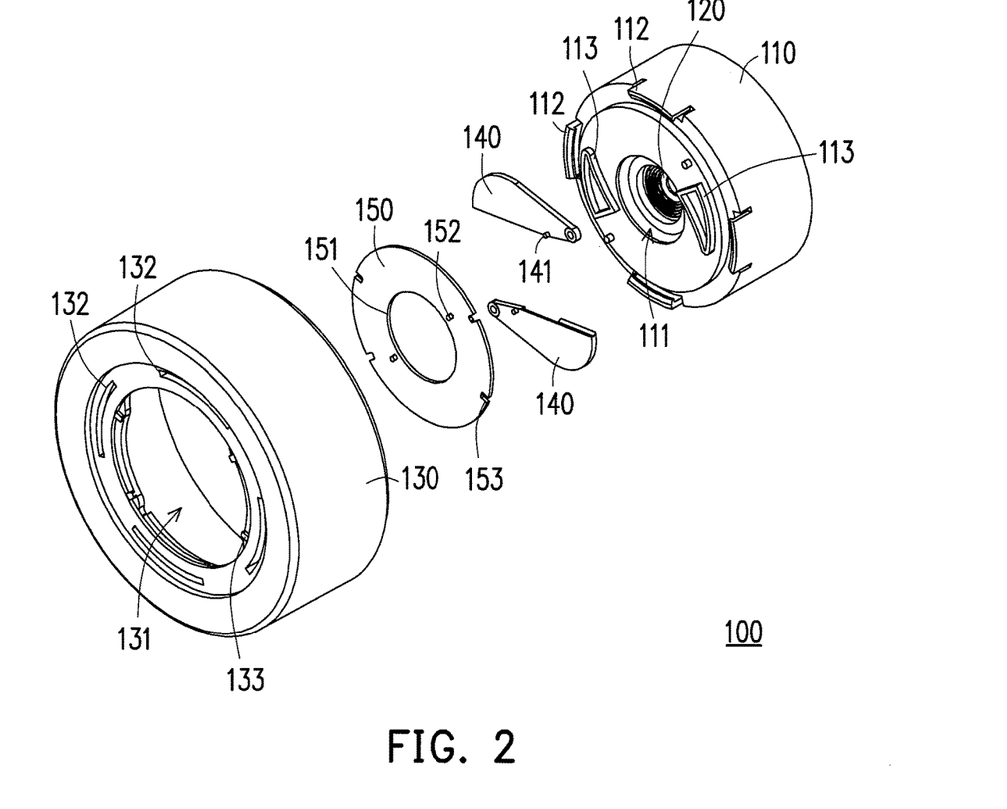
FIG. 2 is an exploded view of the lens module in FIG. 1.
Figure 3A:
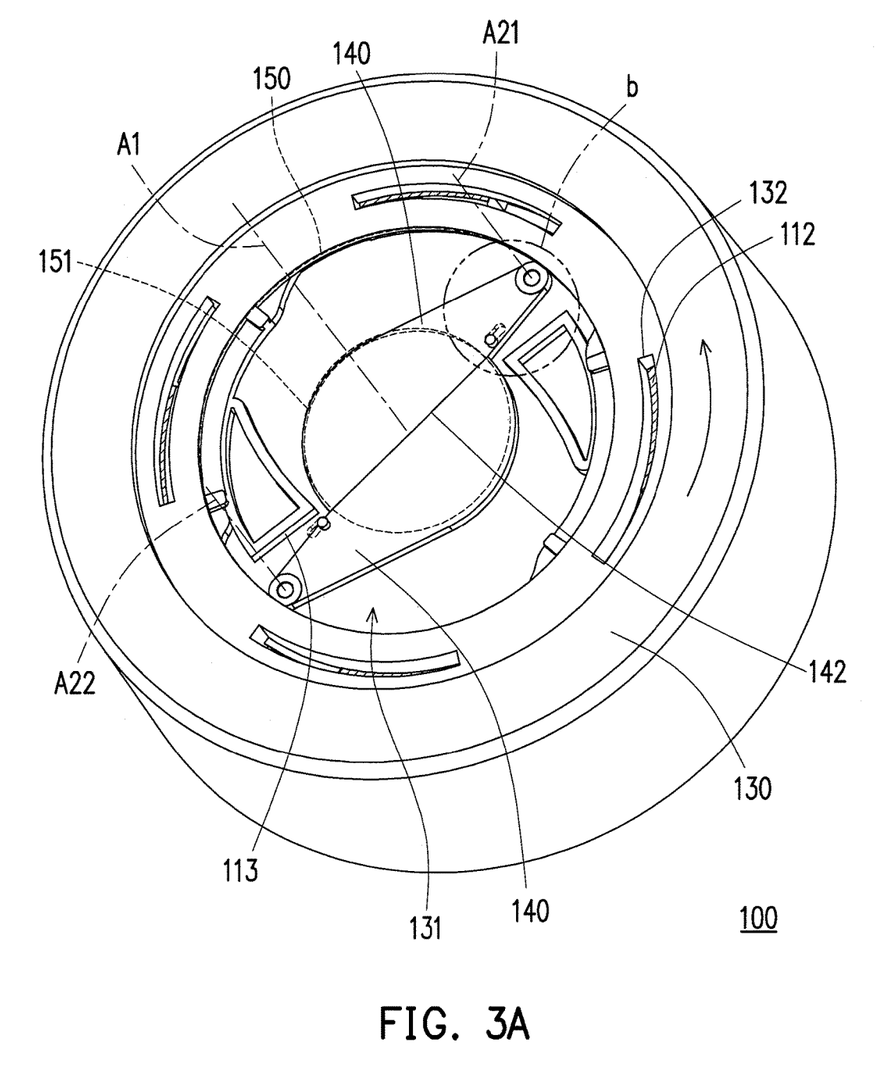
FIG. 3A is a schematic view of a shielding plate in FIG. 1A covering a lens.
Figure 3B:
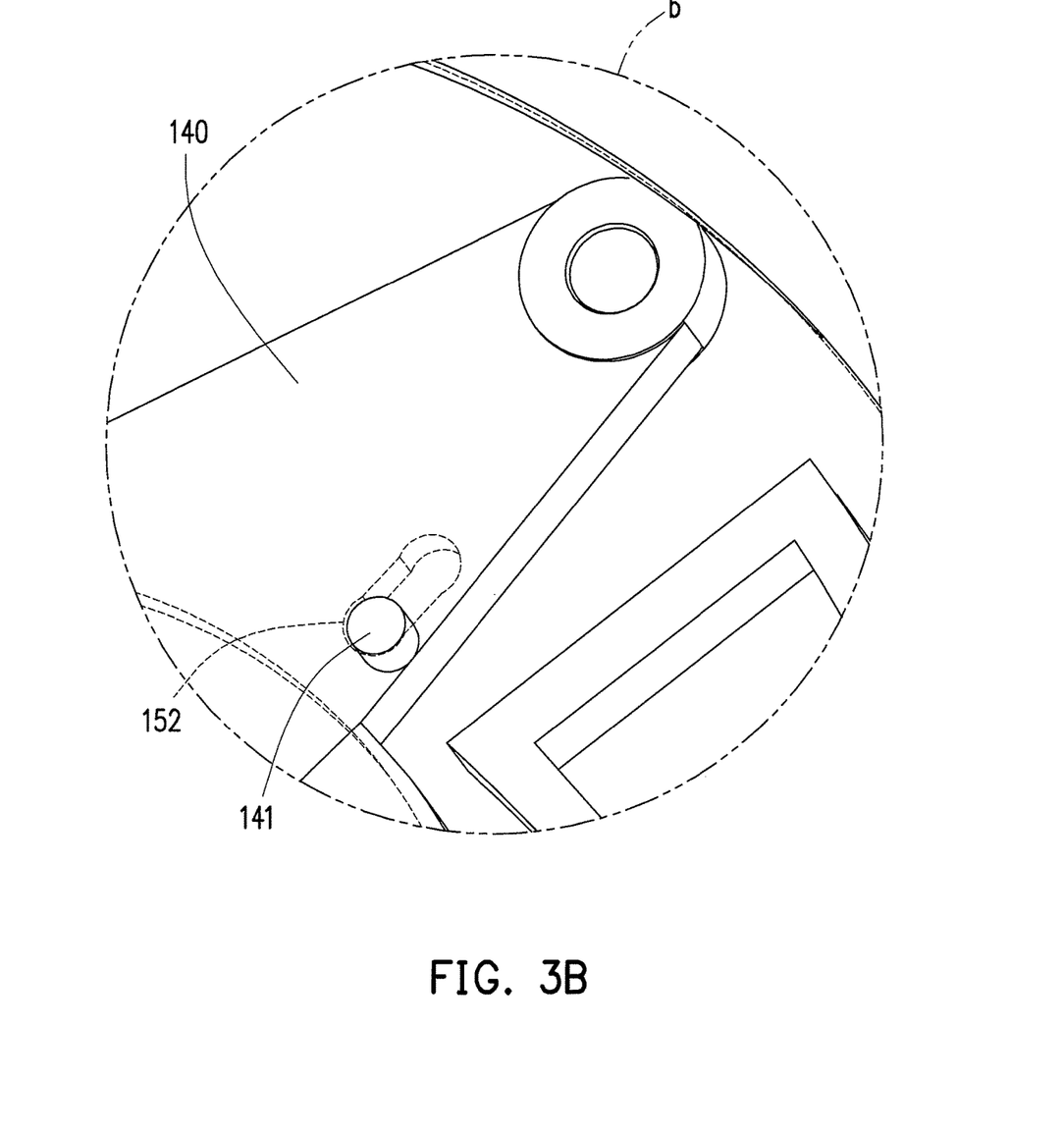
FIG. 3B is a partially enlarged view of an area b in FIG. 3A.

FIG. 1A is a schematic view of a lens module of one embodiment of the invention. FIG. 1B is a partially enlarged view of an area a in FIG. 1A. FIG. 2 is an exploded view of the lens module in FIG. 1. FIG. 3A is a schematic view of a shielding plate in FIG. 1A covering a lens. FIG. 3B is a partially enlarged view of an area b in FIG. 3A. For clarity and ease of explanation, a gasket 150 is depicted by dotted line in FIG. 1A, FIG. 1B, FIG. 3A, and FIG. 3B. Referring to FIG. 1A, FIG. 1B, and FIG. 2, in the present embodiment, a lens module 100 is applicable to monitor, mobile phone, notebook computer, tablet computer, camera, or other electronic devices. For example, the lens module 100 may be electrically coupled to a control unit (not shown), and the control unit (not shown) may be electrically coupled to a wireless (or wired) transmitting unit (not shown). Therefore, the user can remotely send a signal to the wireless (or wired) transmitting unit (not shown), and the wireless (or wired) transmitting unit (not shown) transmits the received signal to the control unit (not shown). At this time, the control unit (not shown) controls the lens module 100 to capture image and to record video according to the signal. In other embodiments, the lens module may be combined with a body (not shown), corresponding physical or virtual buttons are provided on the body (not shown), the user can press or touch the physical or virtual buttons to control the lens module to capture image and to record video. The invention is not limited to the methods to control the lens module to capture image and to record video.

The lens module 100 includes a base 110, a lens 120, a front cover 130, two shielding plates 140, and the gasket 150. The lens 120 is disposed within the base 110. In the present embodiment, the lens 120 may be embedded in the base 110, wherein the base 110 has a window area 111, and the window area 111 exposes at least a part of the lens 120. The front cover 130 is disposed over the base 110 and the lens 120 and has a perforated groove 131. The base 110 and the lens 120 are disposed in the perforated groove 131, and the window area 111 is exposed at the perforated groove 131. The base 110 and the front cover 130 are able to rotate relative to each other about a first axis A1.

Each of the shielding plates 140 has a first guide portion 141. The gasket 150 is fixed on the front cover 130, and the two shielding plates 140 are located between the gasket 150 and the base 110. The two shielding plates 140 are respectively pivoted on the base 110 and able to limitedly swing about second axes A21 and A22 respectively with respect to and between the gasket 150 and the base 110. The second axes A21 and A22 are parallel to each other but not coaxial. The second axes A21 and A22 are respectively parallel to the first axis A1 but not coaxial. In other words, the two shielding plates 140 are eccentrically disposed on the base 110. The gasket 150 has a through hole 151 and a second guide portion 152, wherein the through hole 151 is corresponding to the lens 120 in the window area 111, and each of the first guide portions 141 is coupled to the corresponding second guide portion 152. In the present embodiment, the first guide portions 141 may be sliding pins, the second guide portions 152 may be sliding slots, and the sliding pins are slidably disposed in the sliding slots respectively. In other embodiments, the first guide portions may be sliding slots, and the second guide portions may be sliding pins that are slidably disposed in the sliding slots. Moreover, the gasket 150 further has at least a locking slot 153, the front cover 130 further has at least a locking protrusion 133 protruding from the inner side of the perforated groove 131, and the locking protrusion 133 is engaged with the locking slot 153 to be able to fix the gasket 150 to the front cover 130.

When the user manually rotates the base 110 and the front cover 130 relative to each other, the first guide portion 141 is guided by the second guide portion 152 to make the two shielding plates 140 limitedly swing in different swing directions, and the two shielding plates 140 limitedly swing with respect to and between the gasket 150 and the base 110, so the two shielding plates 140 move to the through hole 151 to cover the lens 120, as shown in FIG. 3A and FIG. 3B. On the other hand, when the first guide portion 141 is guided by the second guide portion 152 to make the two shielding plates 140 limitedly swing in reverse directions of the swing directions, and the two shielding plates 140 limitedly swing with respect to and between the gasket 150 and the base 110, so the two shielding plates 140 move away from the through hole 151 to expose the lens 120, as shown in FIG. 1A. Similarly, before the shielding plate 140 moves to the through hole 151 to cover the lens 120, the shielding plate 140 is sheltered and located right below the gasket 150. Since the shielding plate 140 has a pivot end and a movable end, the relative rotation between the base 110 and the front cover 130 and the guidance of the first guide portion 141 from the second guide portion 152 may make the shielding plate 140 limitedly swing.

Under the circumstance that it is unable to automatically control the shielding plate 140 to move, even if the lens module 100 is equipped with network interconnection function, as long as the user makes the shielding plate 140 cover the lens 120, people with intention will not be able to move the shielding plate 140 to expose the lens 120 in order to obtain private images after remotely invading the lens module 100 via network.

To be more specific, each of the shielding plates 140 has a connecting side edge 142, after the two shielding plates 140 move to the through hole 151 and the two connecting side edges 142 are in contact with each other, the lens 120 is covered by the two shielding plates 140. On the other hand, the sum of areas of the two shielding plates 140 is greater than the cross sectional area of the through hole 151 to ensure that the two shielding plates 140 completely interrupt between the through hole 151 and the lens 120 after the two connecting side edges 142 are in contact with each other. On the other hand, the base 110 has at least a third guide portion 112 (schematically shown as four), and the front cover 130 has at least a fourth guide portion 132 (schematically shown as four) coupled to the third guide portion 112. Although four third guide portions 112 and four fourth guide portions 132 are illustrated in the present embodiment, the number of the third guide portions and the fourth guide portions may be increased or decreased depending on requirements in other embodiments. As shown in FIG. 1A, the four fourth guide portions 132 surrounds the periphery of the lens 120 (or the perforated groove 131), wherein the third guide portions 112 are sliding blocks, the fourth guide portions 132 are sliding slots, and the sliding blocks are slidably disposed in the sliding slots respectively. The length of the sliding slot may be used to determine the stroke of the relative rotation between the base 110 and the front cover 130. In other embodiments, the third guide portions may be sliding slots, and the fourth guide portions may be sliding blocks that are slidably disposed in the sliding slots.

Referring to FIG. 1A and FIG. 3A, the base 110 has at least a supporting portion 113 (schematically shown as two) that is located outside the window area 111 and configured to support the gasket 150, so the gasket 150 and the base 110 define a space accommodating the two shielding plates 140. Although two supporting portions 113 are illustrated in the present embodiment, the number of the supporting portions may be increased or decreased depending on requirements in other embodiments. On the other hand, in the process of rotating each of the shielding plates 140 with respect to the base 110, each of the shielding plates 140 moves from right below the gasket 150 to the through hole 151 or moves from the through hole 151 back to right below the gasket 150, and the supporting portion 113 is located outside a moving path of each of the shielding plates 140, so as to avoid structural interference.

It should be noted here, although the two shielding plates 140 being actuated to cover the lens 120 is introduced in the present embodiment, the number of the shielding plates is increased or decreased depending on requirements in other embodiments. On the other hand, the design principle that the shielding plate is driven by the relative rotation between the base and the front cover to move to the through hole so as to cover the lens or move away from the through hole so as to expose the lens may make the gasket fix to the base and make the shielding plate pivot with respect to the front cover.

Another embodiment is described hereinafter. It should be noted, the embodiments below utilize component labels and partial content from the aforementioned embodiment, wherein identical or similar elements are labeled with identical labels, and therefore description of similar technical content will be omitted. Regarding the description of the omitted parts, reference may be made to the previous embodiment, and will not be repeated in the below embodiment.

Figure 4A:
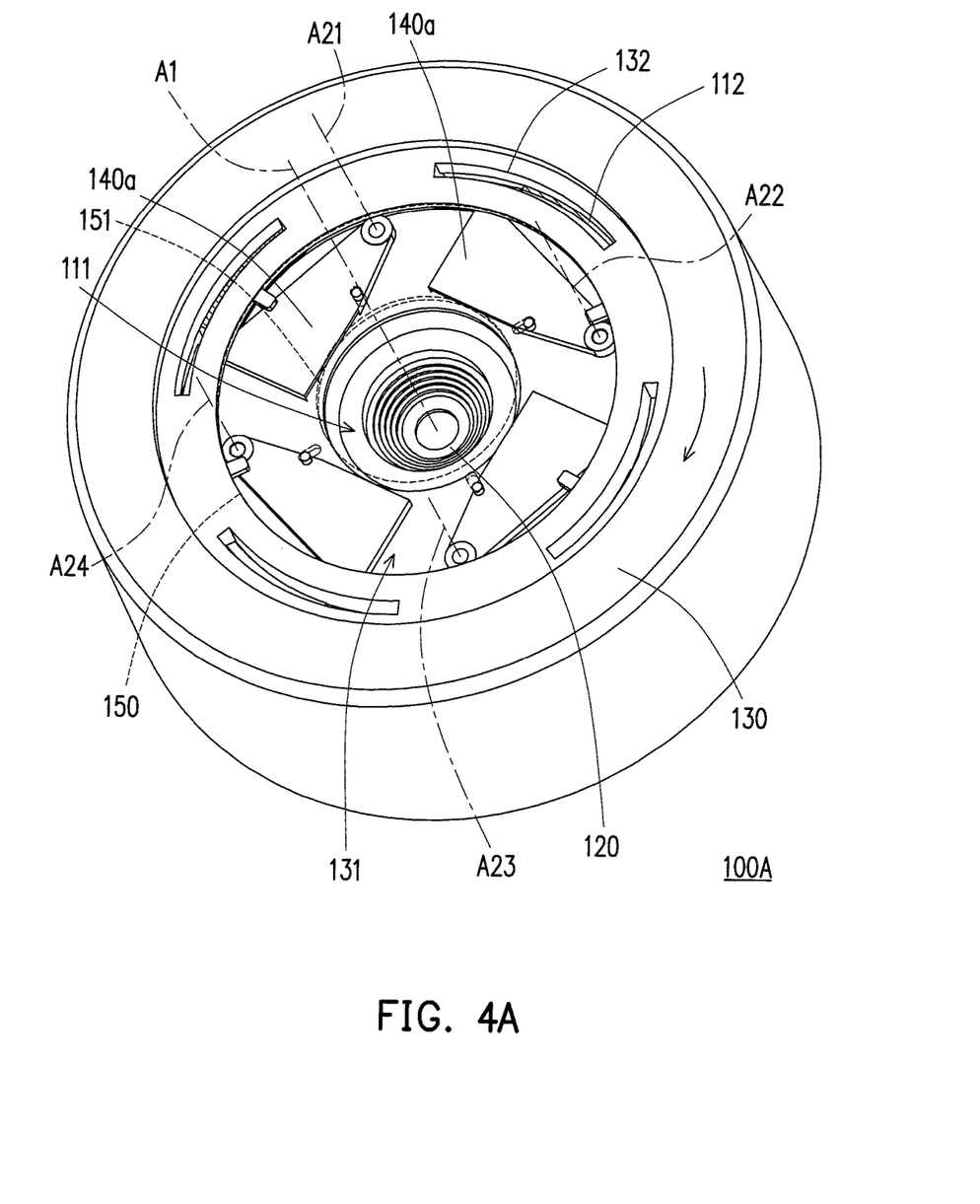
FIGS. 4A and 4B are schematic views of a lens module opening and closing in another embodiment of the invention.
Figure 4B:
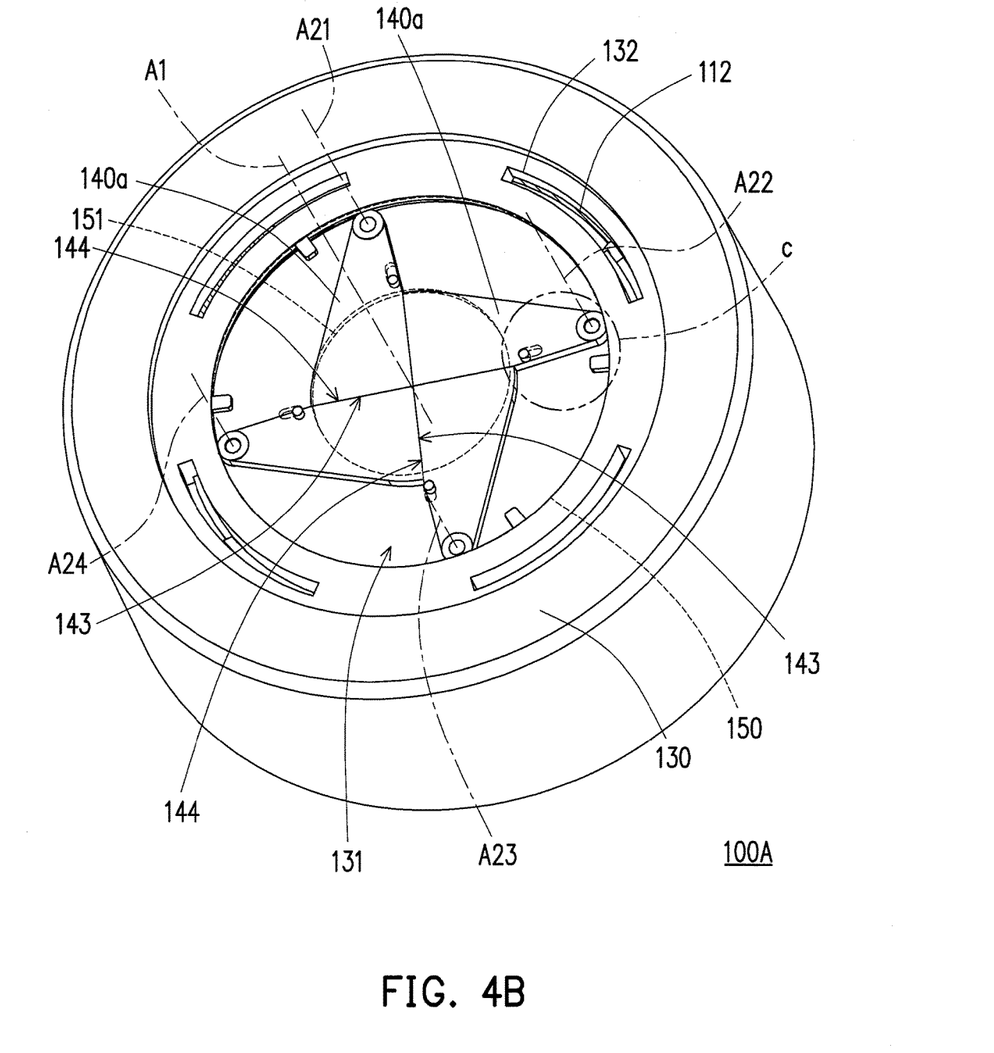
Figure 4C:
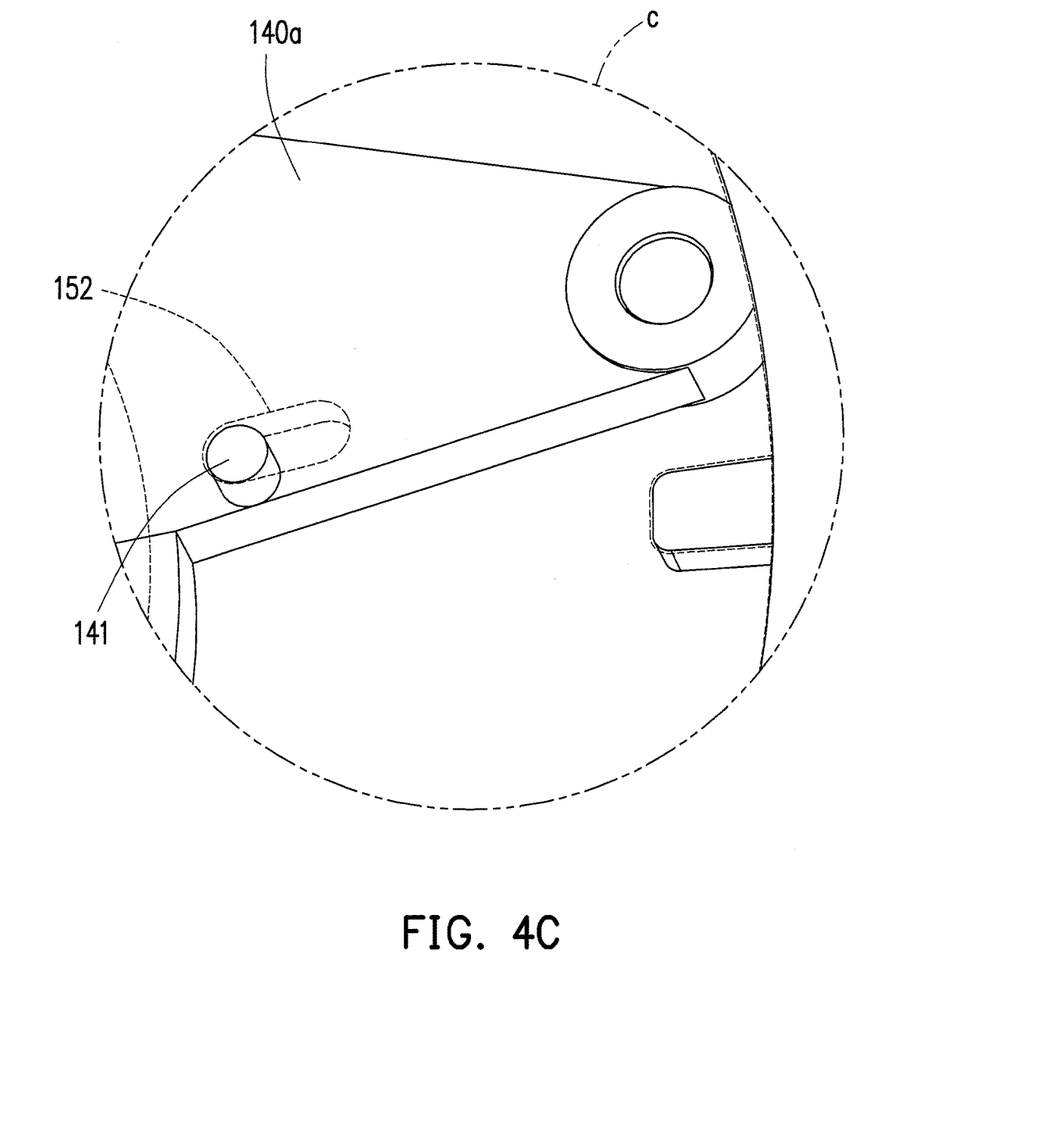
FIG. 4C is a partially enlarged view of an area c in FIG. 4B.

FIGS. 4A and 4B are schematic views of a lens module opening and closing in another embodiment of the invention. FIG. 4C is a partially enlarged view of an area c in FIG. 4B. For clarity and ease of explanation, the gasket 150 is depicted by dotted line in FIG. 4A to FIG. 4C. Referring to FIGS. 4A-4C, a lens module 100A of the present embodiment is similar to the lens module 100 of the aforementioned embodiment, the differences are that the number of shielding plates 140a of the lens module 100A is four and the shielding plates 140a are adapted to rotate about second axes A21 to A24 respectively with respect to the base 110. When the user manually rotates the base 110 and the front cover 130 relative to each other, the first guide portion 141 is guided by the second guide portion 152 to make the four shielding plates 140a limitedly swing in different swing directions, and the four shielding plates 140a limitedly swing with respect to and between the gasket 150 and the base 110, so the four shielding plates 140a move to the through hole 151 to cover the lens 120, as shown in FIG. 4B and FIG. 4C. On the other hand, when the first guide portion 141 is guided by the second guide portion 152 to make the four shielding plates 140a limitedly swing in reverse directions of the swing directions, and the four shielding plates 140a limitedly swing with respect to and between the gasket 150 and the base 110, so the four shielding plates 140a move away from the through hole 151 to expose the lens 120, as shown in FIG. 4A. Similarly, before the shielding plate 140a moves to the through hole 151 to cover the lens 120, the shielding plate 140a is sheltered and located right below the gasket 150.

To be more specific, each of the shielding plates 140a has connecting side edges 143 and 144, after the four shielding plates 140a move to the through hole 151 and the connecting side edges 143 and 144 of any one of the shielding plates 140a are in contact with the connecting side edges 143 and 144 of other two adjacent shielding plates 140a respectively, the lens 120 is covered by the four shielding plates 140a. On the other hand, the sum of areas of the four shielding plates 140a is greater than the cross sectional area of the through hole 151 to ensure that the four shielding plates 140a completely interrupt between the through hole 151 and the lens 120 after the connecting side edges 143 and 144 of any one of the shielding plates 140a are in contact with the connecting side edges 143 and 144 of other two adjacent shielding plates 140a.

Figure 5A:
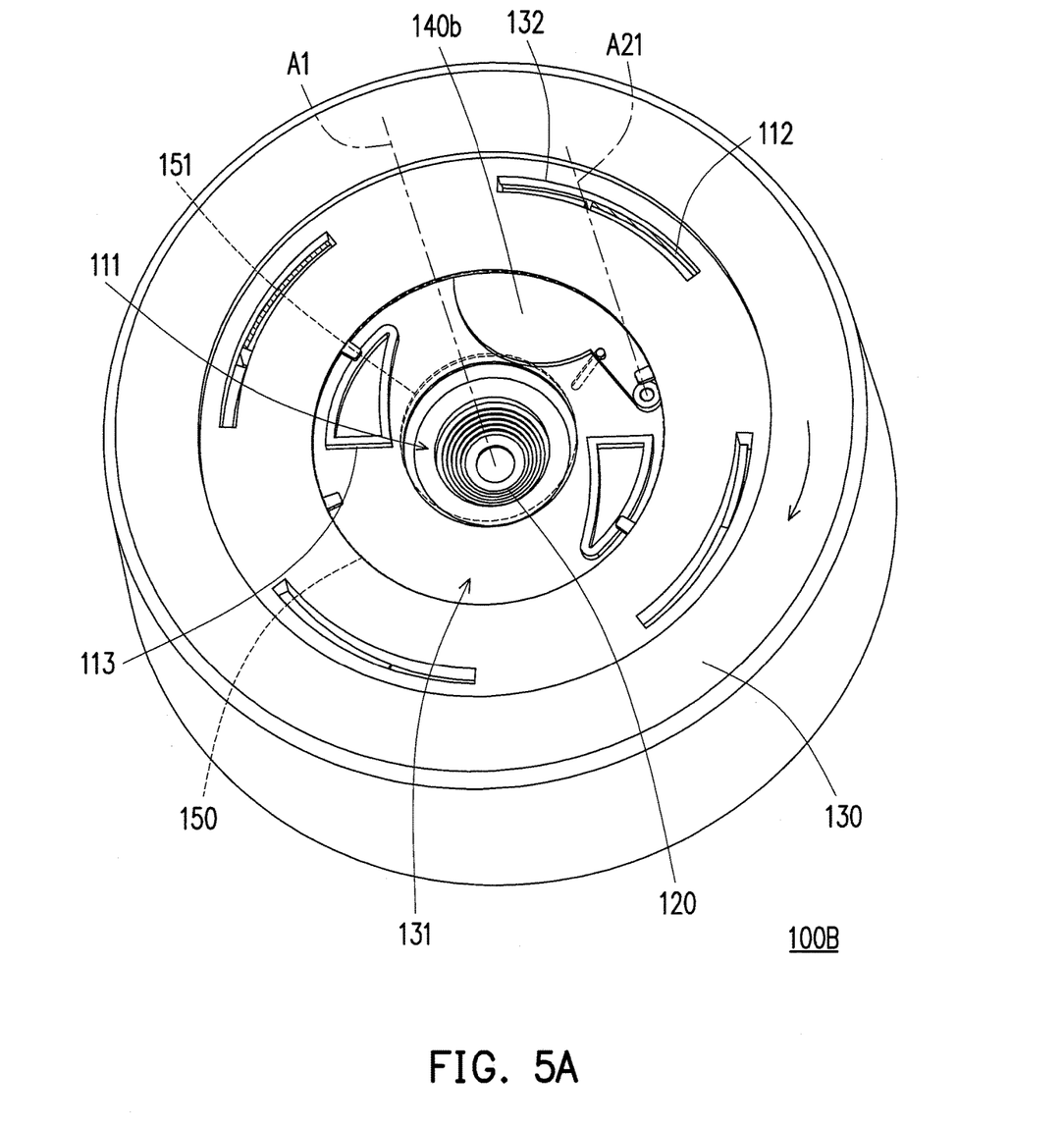
FIGS. 5A and 5B are schematic views of a lens module opening and closing in yet another embodiment of the invention.
Figure 5B:
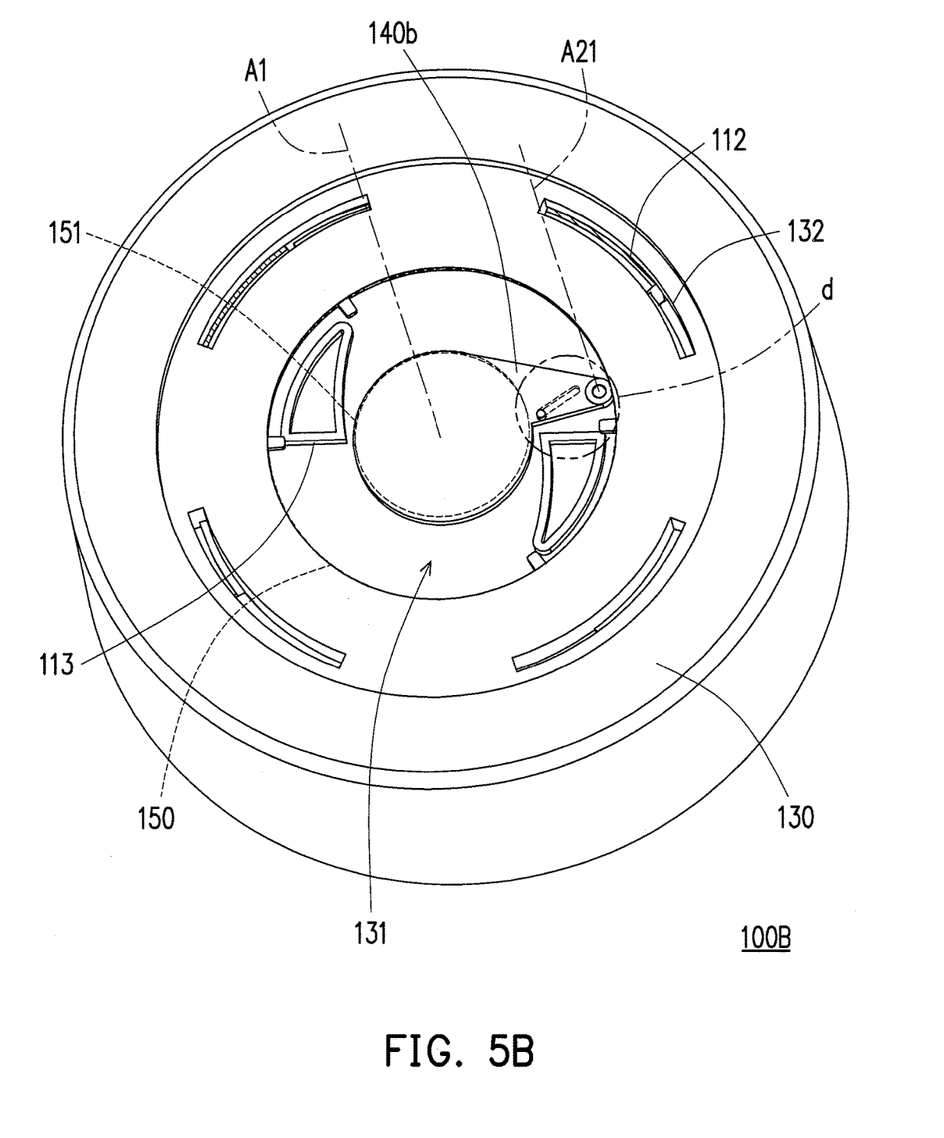
Figure 5C:
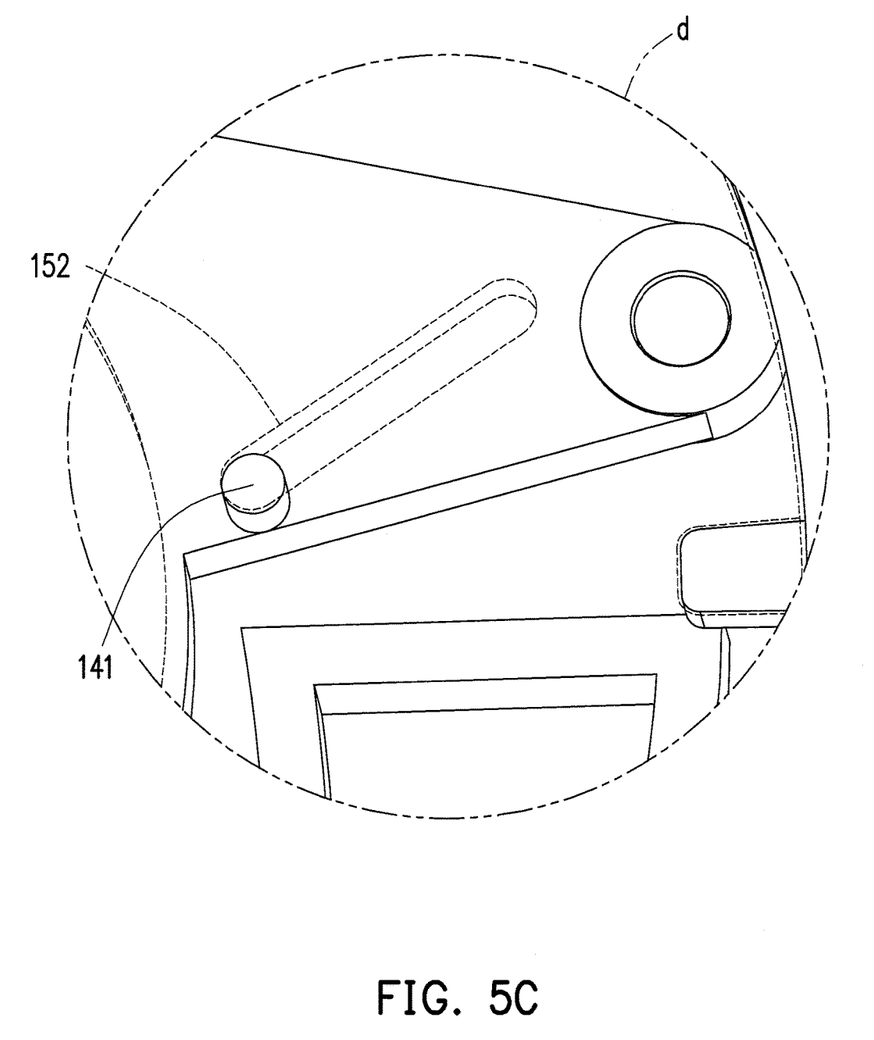
FIG. 5C is a partially enlarged view of an area d in FIG. 5B.

FIGS. 5A and 5B are schematic views of a lens module opening and closing in yet another embodiment of the invention. FIG. 5C is a partially enlarged view of an area d in FIG. 5B. For clarity and ease of explanation, a gasket 150 is depicted by dotted line in FIG. 5A to FIG. 5C. Referring to FIGS. 5A-5C, a lens module 100B of the present embodiment is similar to the lens module 100 of the aforementioned embodiment, the differences are that the number of shielding plate 140b of the lens module 100B is one, and the shielding plate 140b is adapted to limitedly swing about the second axis A21 with respect to and between the gasket 150 and the base 110. When the user manually rotates the base 110 and the front cover 130 relative to each other, the first guide portion 141 is guided by the second guide portion 152 to make the shielding plate 140b limitedly swing in a swing direction, and the shielding plate 140b limitedly swings with respect to and between the gasket 150 and the base 110, so the shielding plate 140b moves to the through hole 151 to cover the lens 120, as shown in FIG. 5B and FIG. 5C. On the other hand, when the first guide portion 141 is guided by the second guide portion 152 to make the shielding plate 140b limitedly swing in a reverse direction of the swing direction, and the shielding plate 140b limitedly swings with respect to and between the gasket 150 and the base 110, so the shielding plate 140b moves away from the through hole 151 to expose the lens 120, as shown in FIG. 5A. Similarly, before the shielding plate 140b moves to the through hole 151 to cover the lens 120, the shielding plate 140b is sheltered and located right below the gasket 150. To be more specific, the area of the shielding plate 140b is greater than the cross sectional area of the through hole 151 to ensure that the shielding plate 140b completely interrupt between the through hole 151 and the lens 120 after the shielding plate 140b moves to the through hole 151.

In summary, the base and the front cover of the lens module of the invention may rotate relative to each other by a manual method to simultaneously make the first guide portion of the shielding plate receive guidance from the second guide portion and make the shielding plate limitedly swing with respect to and between the gasket and the base, so the shielding plate can limitedly swing to either move to the through hole of the gasket so as to cover the lens or move away from the through hole of the gasket so as to expose the lens. Therefore, even if the lens module is equipped with network interconnection function, as long as the user makes the shielding plate cover the lens, people with intention, after remotely invading the lens module via network, will not be able to move the shielding plate to expose the lens in order to obtain private images.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A lens module, comprising:
    a base;
    a lens, disposed within the base;
    a front cover, disposed over the base and the lens, and the base and the front cover being able to rotate relative to each other;
    at least a shielding plate, pivoted on the base and having a first guide portion; and
    a gasket, fixed on the front cover, and the shielding plate being located between the gasket and the base, the gasket having a through hole corresponding to the lens and a second guide portion coupled to the first guide portion, wherein the shielding plate limitedly swings with respect to and between the gasket and the base, and when the base and the front cover rotate relative to each other, the first guide portion is guided by the second guide portion so the shielding plate can limitedly swing to either move to the through hole so as to cover the lens or move away from the through hole so as to expose the lens.

2. The lens module according to claim 1, wherein the base has at least a third guide portion, the front cover has at least a fourth guide portion coupled to the third guide portion, and the fourth guide portion is located at a periphery of the lens.

3. The lens module according to claim 2, wherein the third guide portion is a sliding block, and the fourth guide portion is a sliding slot.

4. The lens module according to claim 1, wherein the first guide portion is a sliding pin, and the second guide portion is a sliding slot.

5. The lens module according to claim 1, wherein a number of the shielding plates is two, each of the shielding plates has a connecting side edge, when the base and the front cover rotate relative to each other, the two shielding plates limitedly swing with respect to and between the gasket and the base, and after the two connecting side edges are in contact with each other, the two shielding plates cover the lens.

6. The lens module according to claim 5, wherein a sum of areas of the two shielding plates is greater than a cross sectional area of the through hole.

7. The lens module according to claim 1, wherein the base has at least a supporting portion configured to support the gasket, so the gasket and the base define a space accommodating the shielding plate.

8. The lens module according to claim 7, wherein the supporting portion is located outside a moving path of the shielding plate.

9. The lens module according to claim 1, wherein the gasket further has at least a locking slot, the front cover further has at least a locking protrusion, and the locking protrusion is engaged with the locking slot.

10. The lens module according to claim 1, wherein the base and the front cover rotate relative to each other about a first axis, the shielding plate limitedly swings about a second axis with respect to and between the gasket and the base, and the first axis and the second axis are parallel to each other and not coaxial.

* * * * *